(12) United States Patent
Hsieh et al.

(10) Patent No.: US 7,865,255 B2
(45) Date of Patent: Jan. 4, 2011

(54) AUDIO BUFFERING SYSTEM AND METHOD OF BUFFERING AUDIO IN A MULTIMEDIA RECEIVER

(75) Inventors: Shining Hsieh, Hsin-Chu Hsien (TW); Zhi-Ren Chang, Hsin-Chu (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 1419 days.

(21) Appl. No.: 10/907,185

(22) Filed: Mar. 23, 2005

(65) Prior Publication Data

US 2005/0226262 A1 Oct. 13, 2005

Related U.S. Application Data

(60) Provisional application No. 60/557,677, filed on Mar. 31, 2004.

(51) Int. Cl.
  *G06F 17/00* (2006.01)
  *G06F 12/00* (2006.01)
  *H04L 1/00* (2006.01)
(52) U.S. Cl. .................. 700/94; 714/747; 711/109
(58) Field of Classification Search .......... 700/94; 710/53, 55–57, 60; 348/462; 386/98–99; 381/119; 714/747
See application file for complete search history.

(56) References Cited

U.S. PATENT DOCUMENTS

| | | | | |
|---|---|---|---|---|
| 4,247,937 A | * | 1/1981 | Paesler | 714/747 |
| 4,531,161 A | * | 7/1985 | Murakoshi | 386/104 |
| 4,829,523 A | * | 5/1989 | Bretl | 714/747 |
| 5,245,667 A | * | 9/1993 | Lew | 381/94.4 |
| 5,553,220 A | * | 9/1996 | Keene | 345/520 |
| 5,642,422 A | * | 6/1997 | Hon et al. | 381/19 |
| 5,815,634 A | * | 9/1998 | Daum et al. | 386/98 |
| 5,942,998 A | | 8/1999 | Matsuoka | |

(Continued)

FOREIGN PATENT DOCUMENTS

DE 100 20 219 A1 10/2001

(Continued)

OTHER PUBLICATIONS

Philips Semiconductors, I2S bus specification, Jun. 5, 1996, Philips Semiconductors, entire document.*

*Primary Examiner*—Curtis Kuntz
*Assistant Examiner*—Jesse A Elbin
(74) *Attorney, Agent, or Firm*—Winston Hsu; Scott Margo

(57) ABSTRACT

An audio buffering system in a multimedia receiver includes an audio interface coupled to an incoming audio signal for generating a digital audio signal having transmitted therein a plurality of data words; a first-in-first-out (FIFO) buffer being coupled to the digital audio signal and comprising a plurality of cells being organized sequentially for holding data words of the digital audio signal, wherein a first cell of the FIFO buffer has an input being coupled to the digital audio signal; and a first shift register having a plurality of bits being organized serially, wherein a first bit of the first shift register receives an output from a last bit of the first shift register, and each bit of the first shift register is coupled to a corresponding bit in an outputted data word of the FIFO buffer. The first shift register is loaded with data words outputted from the FIFO buffer.

13 Claims, 13 Drawing Sheets

U.S. PATENT DOCUMENTS

| | | |
|---|---|---|
| 6,023,233 A | 2/2000 | Craven |
| 6,057,789 A | 5/2000 | Lin |
| 6,226,758 B1 * | 5/2001 | Gaalaas et al. .............. 713/600 |
| 6,710,725 B1 * | 3/2004 | Soques ........................ 341/61 |

FOREIGN PATENT DOCUMENTS

| | | |
|---|---|---|
| JP | 2002-203361 | 7/2002 |
| TW | 461220 | 10/2001 |
| TW | 531694 | 5/2003 |
| TW | 548925 | 8/2003 |
| WO | WO 03/047115 * | 6/2003 ................. 714/747 |

* cited by examiner

AUDIO BUFFERING SYSTEM AND METHOD OF BUFFERING AUDIO IN A MULTIMEDIA RECEIVER

CROSS REFERENCE TO RELATED APPLICATIONS

This application claims the benefit of U.S. Provisional Application No. 60/557,677, filed Mar. 31, 2004, entitled "Audio FIFO Buffer and Methods in a Multimedia Receiver" and included herein by reference.

BACKGROUND OF INVENTION

1. Field of the Invention

The invention relates to buffering audio data within a multimedia receiver, and more particularly, to a first-in-first-out (FIFO) buffer architecture and related method of audio data buffering for use in a multimedia receiver.

2. Description of the Prior Art

FIG. 1 shows a typical multimedia receiver 100 being coupled to a plurality of audio and visual devices 102. Each of the audio and visual devices 102 acts as an input source to the multimedia receiver 100 and allows for a variety of different media types or programming content sources to be inputted into the multimedia receiver 100.

FIG. 2 shows a block diagram of a multimedia receiver 200 according to the related art. In order to process an incoming video signal $V_{IN}$, the multimedia receiver 200 includes a video processing unit 202. An incoming audio signal $A_{IN}$ is coupled to an audio processing unit 204. Typically the video processing unit 202 requires more processing time than the audio processing unit 204. Therefore, the multimedia receiver 200 further includes an audio first-in-first-out (FIFO) buffer 206 to perform audio synchronization. The FIFO buffer 206 adds an appropriate delay to left and right audio channels in order to synchronize the outputted audio signals Left, Right with the outputted video signal Video. For example, the audio synchronization performed by the FIFO buffer 206 ensures a person's voice is heard at that exact time that the person's mouth moves in a scene of the outputted video.

FIG. 3 shows an example of a video frame within the incoming video signal $V_{IN}$. The video frame includes three data periods: video data period, a control period, and a data island period. The data island period is for transmitting the audio data and other auxiliary data. Since the audio data can only be transmitted during the blanking area, the audio data for the whole frame must be accumulated during the blanking area, hence the audio data tends to be "bursty" in nature. In this situation, the FIFO buffer 206 of FIG. 2 will also perform rate matching between the incoming audio rate and the different outgoing audio rate. For example, the irregular incoming audio rate can be smoothed into a steady outgoing audio rate to prevent overflow and underflow situations from occurring.

As shown in FIG. 2, the FIFO buffer 206 is organized in two channels: a left channel comprising 100 cells, and a right channel also comprising 100 cells. The audio processing unit 204 typically receives a serial stream of bits in the incoming audio signal $A_{IN}$ and outputs parallel data words for both the left and right channels, which are then input into the respective channel of the FIFO buffer 206. Each time a new data word is outputted by audio processing unit 204, the respective channel of the FIFO buffer 206 is shifted to the right by one word. In this way, the first audio data words inputted into a channel of the FIFO buffer 206 are also the first audio data words to be later outputted by that channel of the FIFO buffer 206.

However, due to interference, erroneous data, noise, or other detrimental causes, sometimes there will be errors in the data of the incoming audio signal $A_{IN}$. In this situation, the audio processing unit 204 will not be able to properly output a corresponding audio data word. For example, FIG. 2 shows a situation where the third data word in the right channel to the forty-fourth data word in the right channel are lost due to errors. That is, the right channel of the FIFO buffer 206 contains the first and second data words $R_1$ and $R_2$ as expected; however, the third cell of the right channel skips to the forty-fifth data word $R_{45}$. This is because data words $R_3$ to $R_{44}$ were in error and were therefore not outputted by the audio processing unit 204.

In this situation, due to the missing data words $R_3$ to $R_{44}$, when the outputted right channel audio signal Right is played back on an attached speaker, a distorted noise will be apparent to a user of the multimedia receiver 200. For example, a very loud popping noise or clicking sound may occur. This audio playback distortion is caused because audio samples formed by the data words R3 to R44 are missing and therefore there is not a smooth transition between audio samples sent to the speaker. The resulting playback distortion is very noticeable and annoying to the user, and an improved method of performing audio synchronization and rate matching that prevents distortion of the outputted audio signal would be beneficial.

SUMMARY OF INVENTION

One objective of the claimed invention is therefore to provide an audio buffering system in a multimedia receiver that automatically repeats bits in a shift register so that in the event of an error, data words are repeated to thereby solve the above-mentioned problem.

According to an exemplary embodiment of the claimed invention, an audio buffering system in a multimedia receiver is disclosed. The audio buffering system comprises an audio interface being coupled to an incoming audio signal for generating a digital audio signal having transmitted therein a plurality of data words; a first-in-first-out (FIFO) buffer being coupled to the digital audio signal and comprising a plurality of cells being organized sequentially for holding data words of the digital audio signal, wherein a first cell of the FIFO buffer has an input being coupled to the digital audio signal; and a first shift register having a plurality of bits being organized serially, wherein a first bit of the first shift register receives an output from a last bit of the first shift register, and each bit of the first shift register is coupled to a corresponding bit in an outputted data word of the FIFO buffer; wherein the first shift register is loaded with data words outputted from the FIFO buffer.

According to another exemplary embodiment of the claimed invention, a method of buffering audio in a multimedia receiver is disclosed. The method comprises generating a digital audio signal having transmitted therein a plurality of data words according to an incoming audio signal; providing a first-in-first-out (FIFO) buffer having a plurality of cells being organized sequentially for holding data words of the digital audio signal, and having an input of a first cell of the FIFO buffer being coupled to the digital audio signal; providing a first shift register having a plurality of bits being organized serially; receiving an output from a last bit of the first shift register by a first bit of the first shift register; and loading the first shift register with data words outputted from the FIFO buffer.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
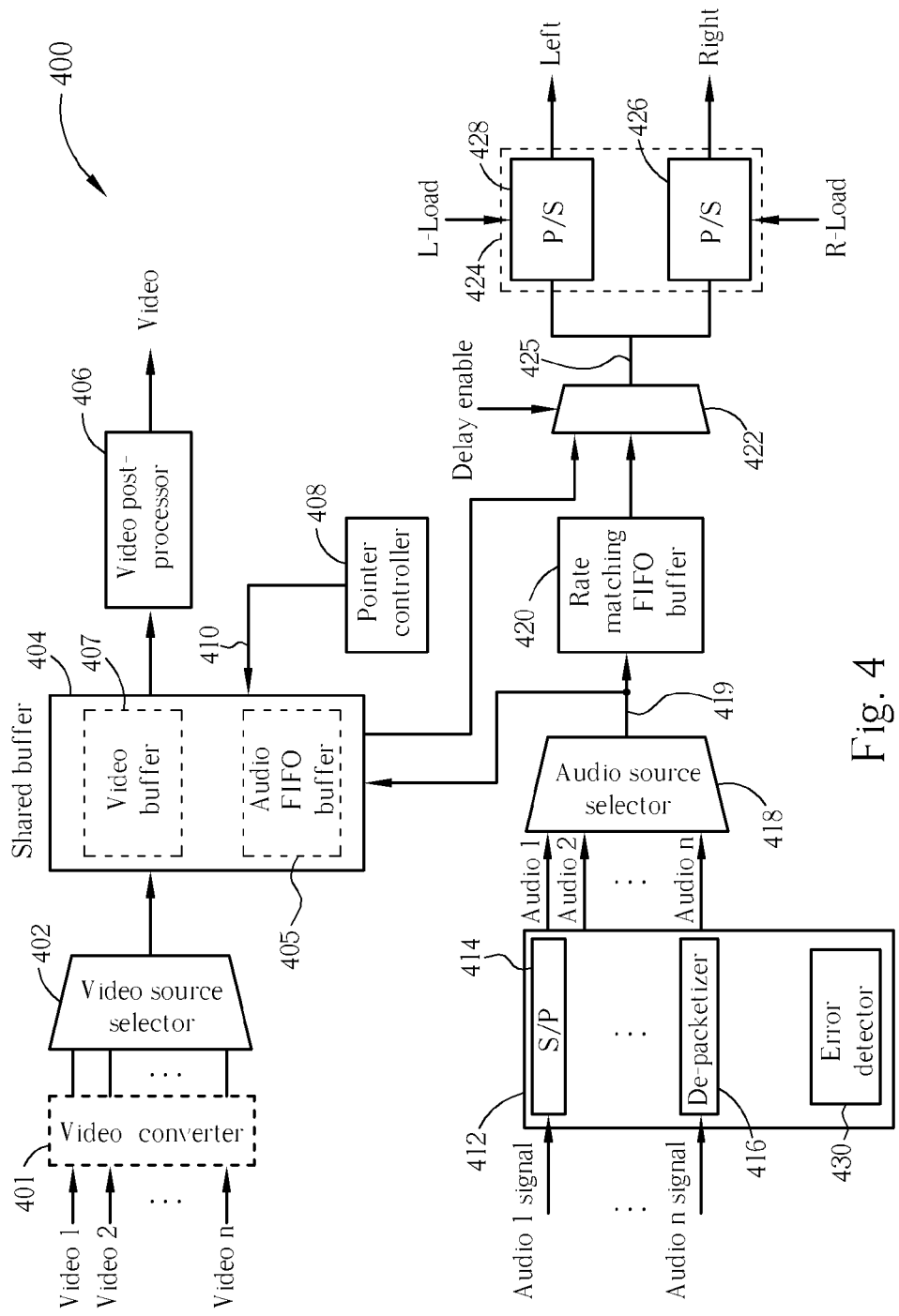
FIG. 4 shows a block diagram of a multimedia receiver according to an exemplary embodiment of the present invention.

FIG. 4 shows a block diagram of a multimedia receiver 400 according to an exemplary embodiment of the present invention. In this embodiment, the multimedia receiver 400 includes a video converter 401, a video source selector 402, a shared buffer 404, a video post-processor 406, a pointer controller 408, a plurality of audio converters 412, an audio source selector 418, a rate matching first-in-first-out (FIFO) buffer 420, a multiplexer 422, and an output converter 424. As shown in FIG. 4, the shared buffer 404 includes a video buffer 407 and an audio FIFO buffer 405 and receives a pointer control signal 410 from the pointer controller 408. Additionally, the audio converters 412 include a first serial to parallel converter (S/P) 414 and a de-packetizer 416; and the output converter 424 includes a plurality of parallel to serial converters (P/S), such as a first shift register 426 and a second shift register 428.

Figure 1:
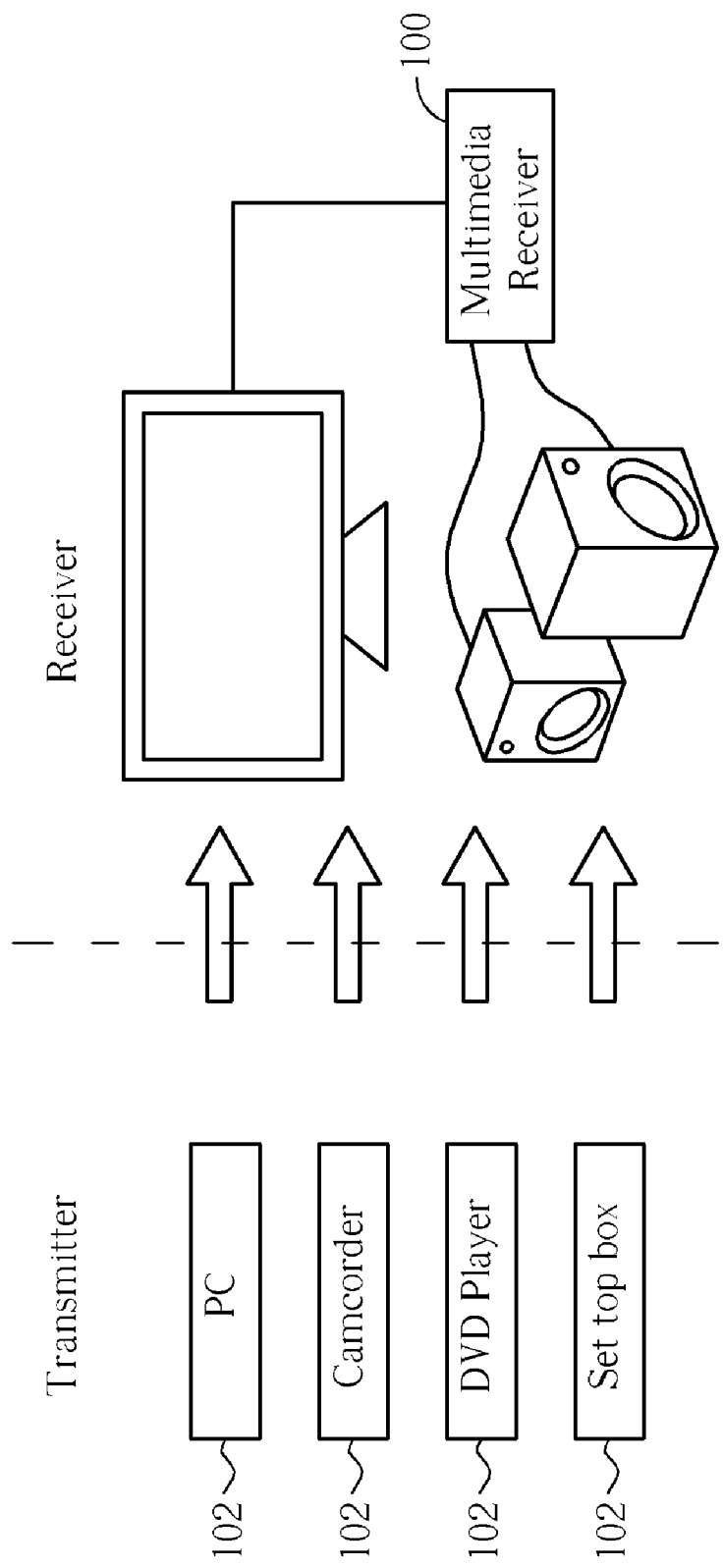
FIG. 1 shows a typical multimedia receiver being coupled to a plurality of audio and visual devices.
Figure 2:
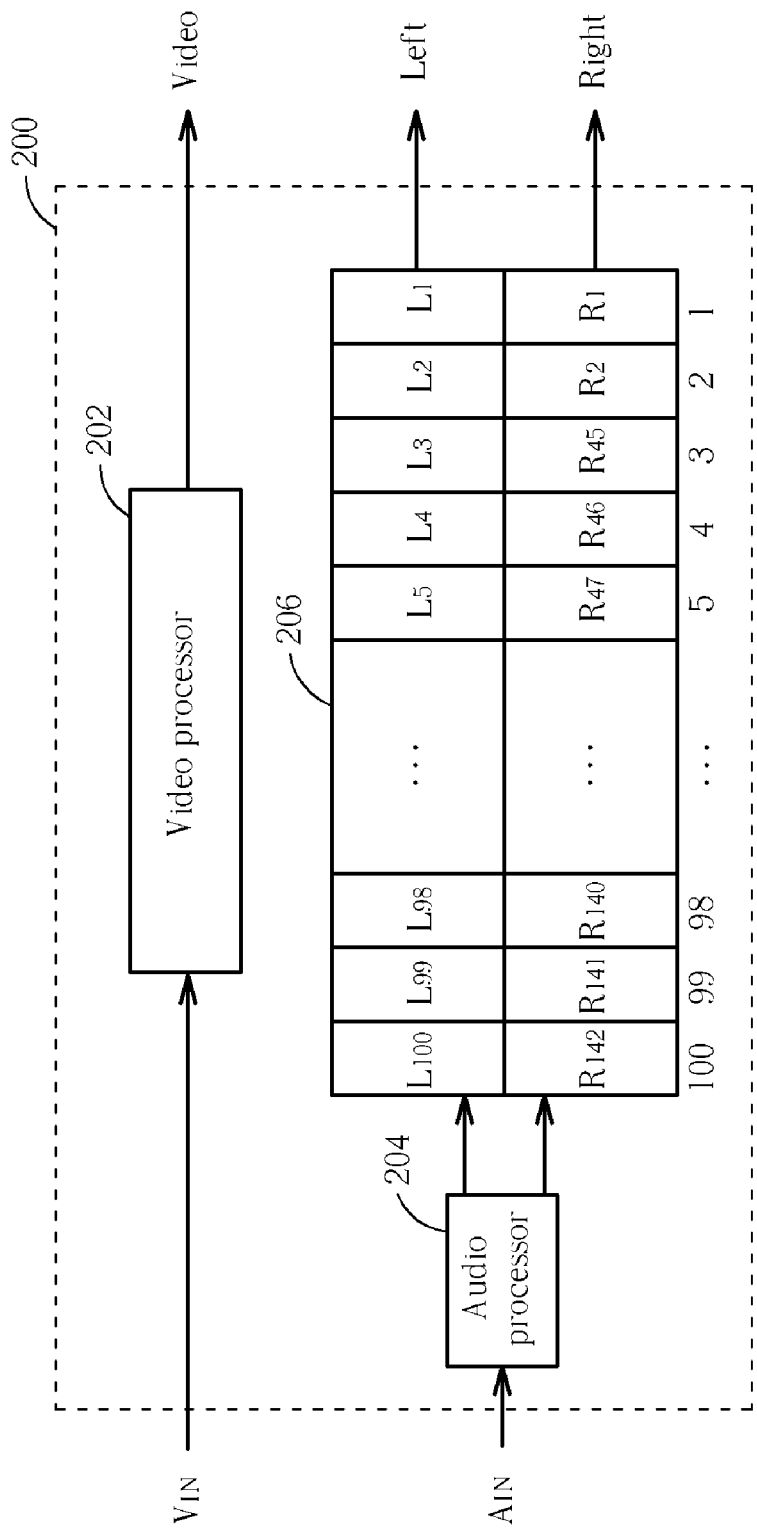
FIG. 2 shows a block diagram of a multimedia receiver according to the related art.
Figure 3:
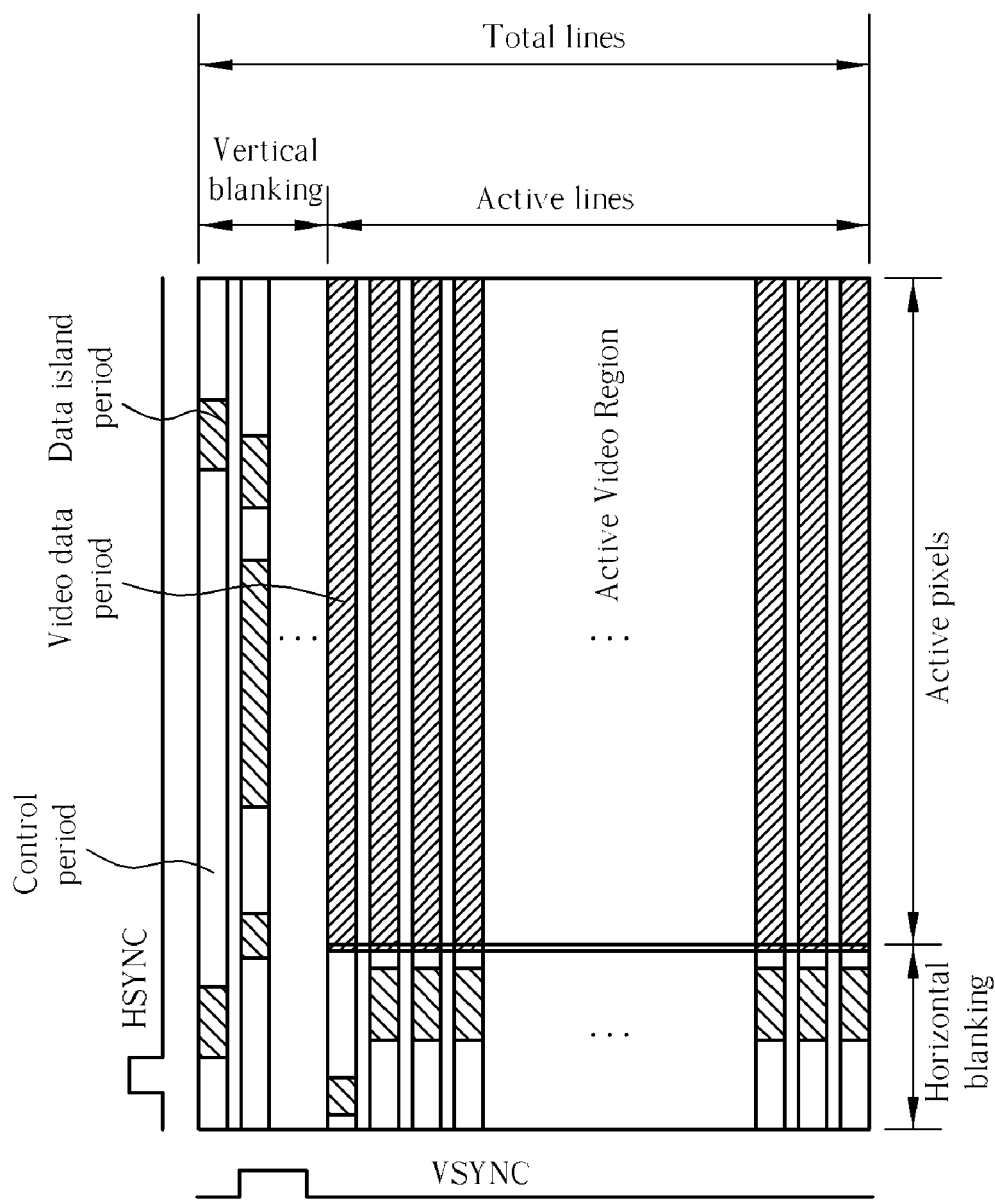
FIG. 3 shows an example of a video frame within the incoming video signal $V_{IN}$ of FIG. 2.

The multimedia receiver 400 supports multiple video and audio input sources, such as the audio and visual devices 102 of FIG. 1, and which may employ different transmitting data rates and formats. The multimedia receiver 400 includes at least one input source converter 412 for receiving different audio input sources. The converter 412 may include a serial to parallel converter 414 and/or a de-packetizer 416. The input source converter 412 acts as an audio interface being coupled to an incoming audio signal (Audio 1 signal to Audio n signal in FIG. 4) for generating a digital audio signal (Audio 1 to Audio n) having transmitted therein a plurality of audio data words. The audio source selector 418 is for selecting one of the input sources as the active source and for sending a corresponding digital audio signal 419 (such as a formatted audio data) into the audio FIFO buffer 405 in the shared buffer 404, or into the rate matching FIFO 420, preferably depending on delay enable signal. It should be noted that, in another embodiment, the audio source selector 418 could also be positioned before the input source converter 412 for selecting between a plurality of different incoming audio signals. The shared buffer 404 temporarily stores the video and audio data and performs the audio synchronization functions, while the rate matching FIFO 420 serves as a buffer for formatted audio samples and performs rate matching operations. Finally, the first shift register 426 and the second shift register 428 in the output converter 424 perform the conversion from parallel data to a serial data stream.

As stated earlier, the input audio source (Audio 1 signal to Audio n signal) may be constant or bursty. As previously explained, the input audio source may be bursty due to being transmitted with the video frame signal in the blanking period. Regardless of the type of input audio source used, the output audio Left, Right must always run at a constant rate. The rate matching FIFO 420 is used to balance between the input audio stream (Audio 1 signal to Audio n signal) and the output audio stream Left, Right. The size of the rate matching FIFO 420 is calculated based on the fastest input audio rate, and a measure of the irregular nature of the input audio streams.

Figure 5:
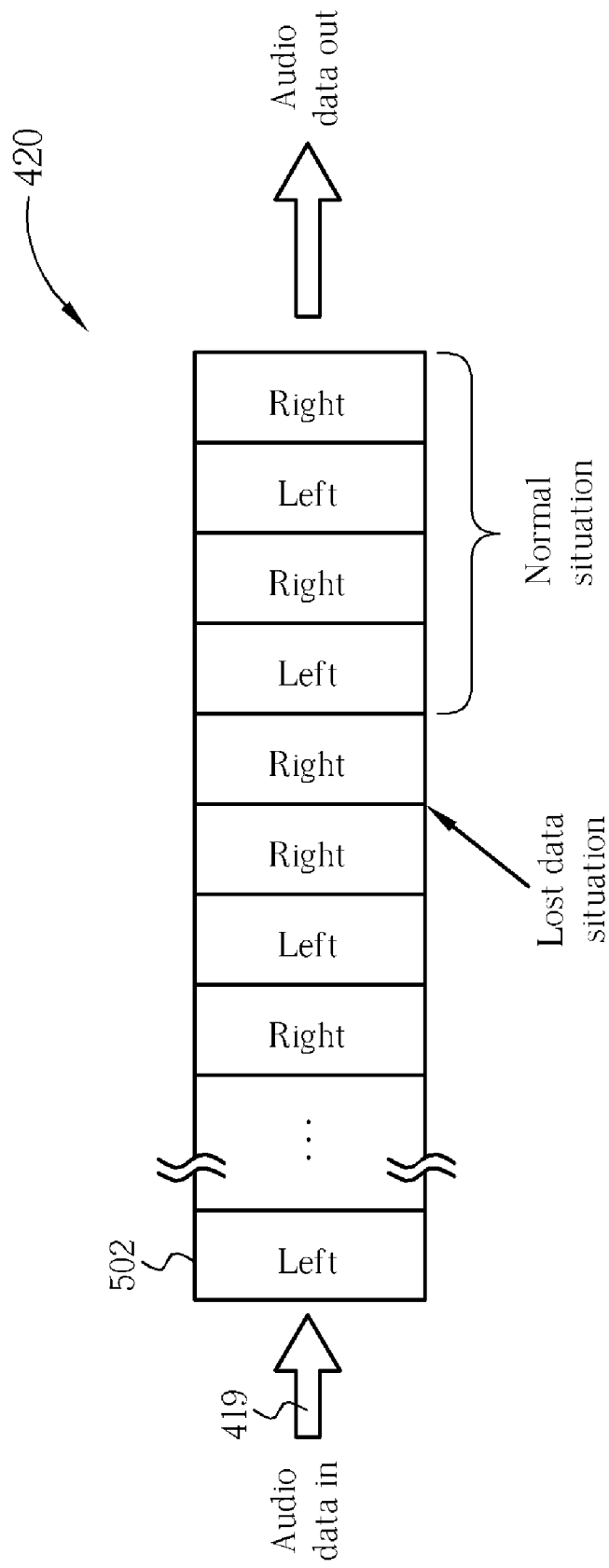
FIG. 5 shows the structure of the audio first-in-first-out (FIFO) buffer and the rate matching FIFO buffer of FIG. 4 according to an exemplary embodiment of the present invention.

FIG. 5 shows the structure of the rate matching FIFO buffer 420 according to an exemplary embodiment of the present invention. The FIFO buffer 420 shown in FIG. 5 includes a plurality of cells being organized sequentially for holding data words of the digital audio signal 419 being outputted by the audio source selector 418. For example, each cell in the FIFO buffer 420 could be thirty-two bits wide. Within the FIFO buffer 420, a first cell 502 has an input being coupled to the digital audio signal 419, and each time a new data word is received, the content of the cells in the FIFO buffer 420 is shifted to the right by one cell. In this way, the first audio data words inputted into the FIFO buffer 420 are also the first audio data words to be later outputted by the FIFO buffer 420. Alternatively, FIFO buffer 420 can be a circular structure with a read pointer and a write pointer for first-in-first-out control.

As will become clear to a person of ordinary skill after reading the follow description, the FIFO buffer 420 shown in FIG. 5 and described hereafter can be utilized for providing rate matching between an audio source 102 and a multimedia receiver 400, or can be utilized for providing audio delay buffering for synchronizing audio content with corresponding video content within the multimedia receiver 400. That is, the FIFO buffer 420 shown in FIG. 5 could be utilized according to the present invention to implement the rate matching FIFO buffer 420 of FIG. 4, or used to implement both the audio FIFO buffer 405 and the rate matching FIFO buffer 420 of FIG. 4.

Figure 6:
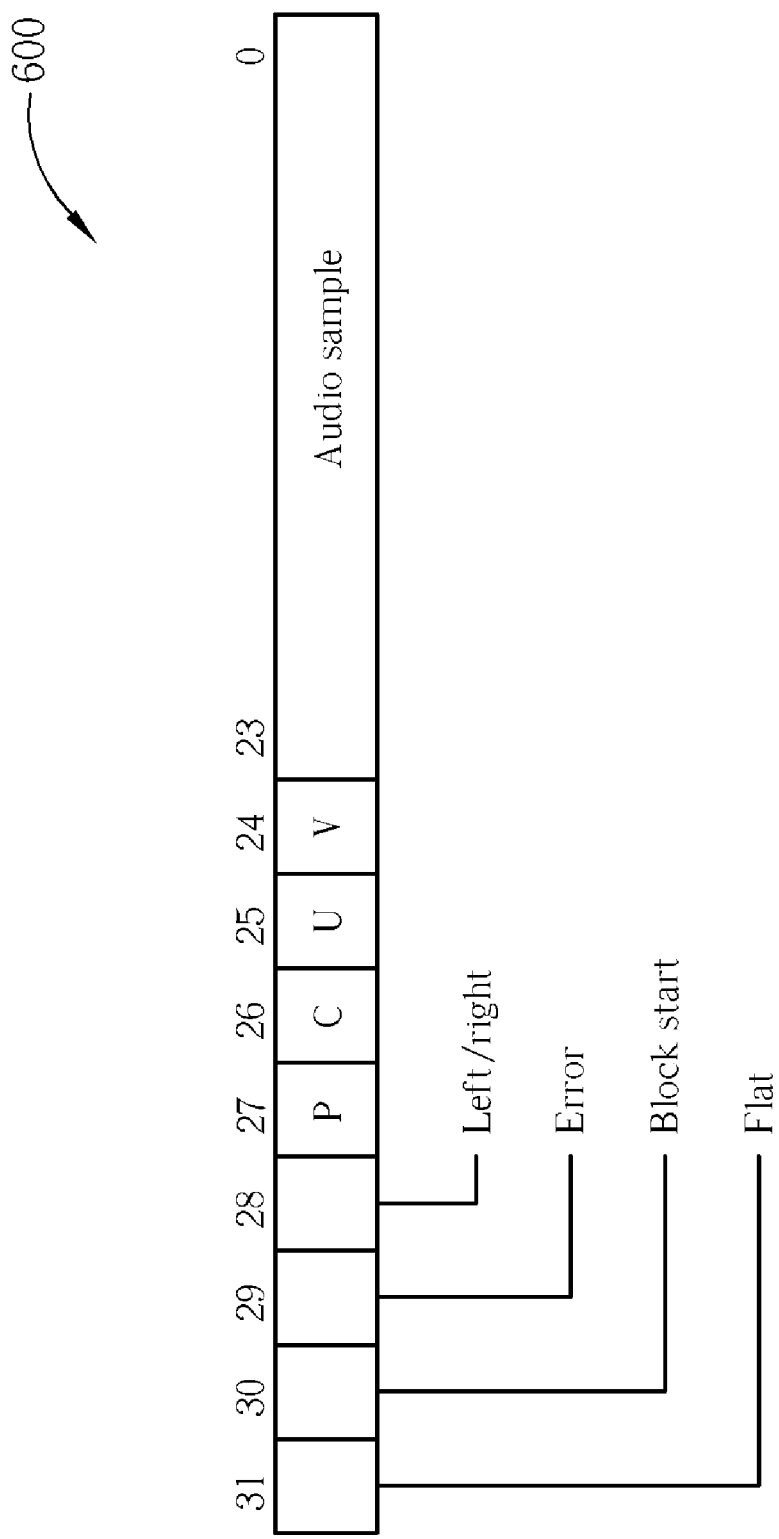
FIG. 6 shows a data word structure of audio data words being stored in the FIFO buffer of FIG. 5.

FIG. 6 shows a data word structure of audio data words being stored in the FIFO buffer 420 of FIG. 5. In this exemplary embodiment, each audio data word outputted by the audio source selector 418 in the digital audio signal 419 includes 32 bits [0:31], where bit 0-bit 23 are for the audio sample data bits, and bit 24-bit 31 are control flags. As an example, the left/right flag (bit 28) indicates whether the audio sample is for the left or the right channel in a stereo sound system. The error flag (bit 29) indicates whether the audio sample data is good or bad. If the input audio sample is a bad sample, the error flag (bit 29) is set. For example, the multimedia receiver 400 can further include an error detector 430 for asserting the error flag (bit 29) as a validity indictor for data words in the digital audio signal 419 being free of errors. As shown in FIG. 5, both the right channel and the left channel are stored together sequentially in the FIFO buffer 420. That is, in a normal situation, right channel data words alternate with left channel data words, and the output data is preferably repeated. For example, when a left channel data word is lost, the previous left channel data word is repeated at the output end.

Figure 7:
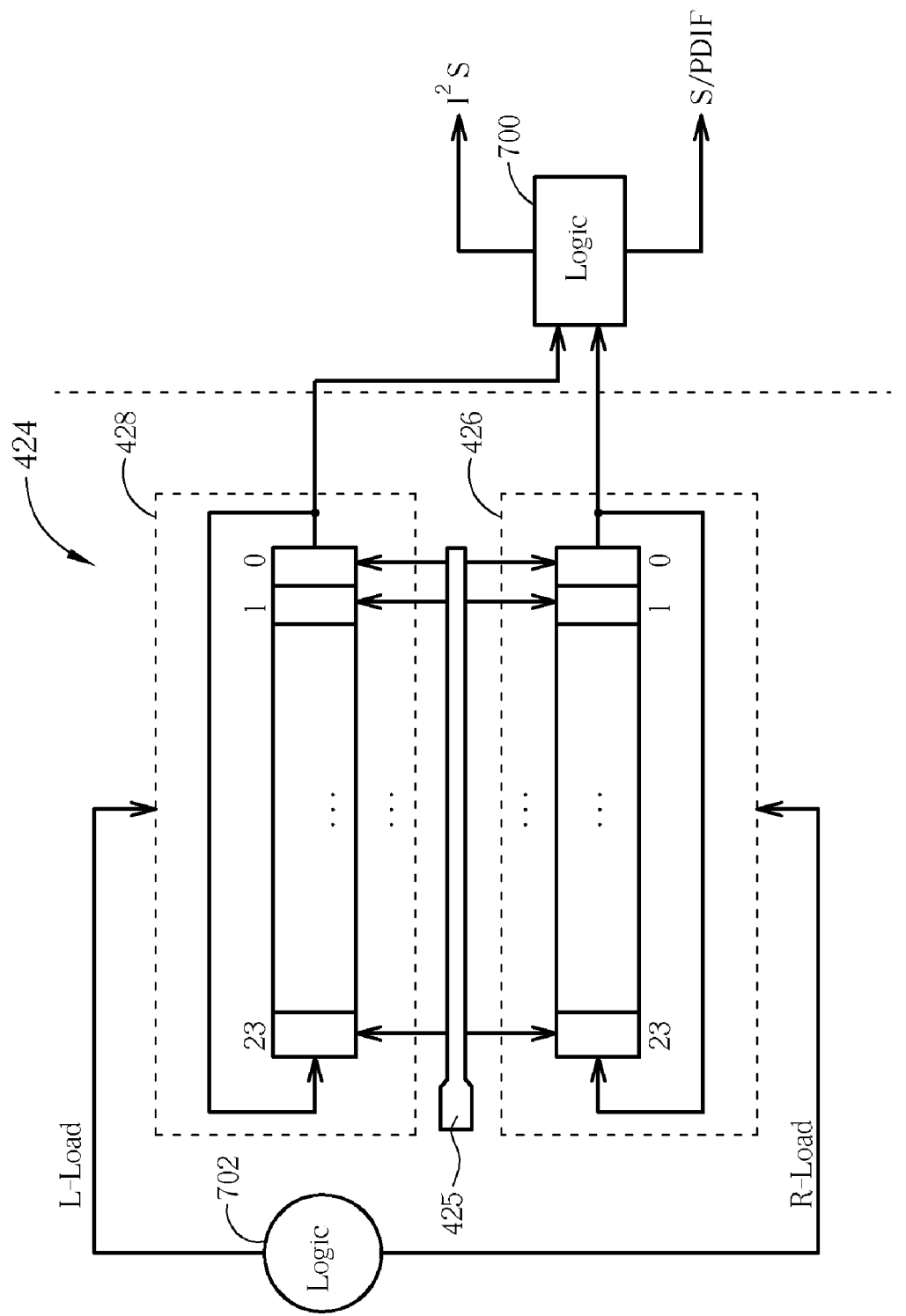
FIG. 7 shows a block diagram of the first shift register in the output converter.

FIG. 7 shows a block diagram of the first shift register 426 in the output converter 424. In this embodiment, the output converter 424 includes the first shift register 426, and the second shift register 428 being coupled to logic 700 for converting the output data format of the audio data for later processing. Additionally, logic 702 is utilized to generate the R-Load signal, and the L-Load signal to select the good samples in the signal 425 being outputted by the audio FIFO buffer 420. The first shift register 426 has a plurality of bits being organized serially, wherein a first bit (bit 23) of the first shift register 426 receives an output from a last bit (bit 0) of the first shift register 426. Each bit of the first shift register 426 is coupled to a corresponding bit in an outputted data word of the FIFO buffer 420 and are shifted out serially to the logic 700. When the R-Load signal is asserted (meaning a good data word having a right side flag being set is outputted by the FIFO buffer 420), the first shift register 426 is loaded with the good data word outputted from the FIFO buffer 420. When the FIFO buffer 420 does not output a data word, the shift register 426 continues to repeatedly shift in bits that are output from the last bit (bit 0) of first shift register 426. That is, a value of the first bit (bit 23) the first shift register 426 is shifted in according to a value outputted from the last bit (bit 0) of the first shift register 426.

In this way, in the case of a missing left or a missing right channel sample, the operations of the FIFO 420 and output converter 424 remain intact and the output audio rate can be perfectly maintained. Accordingly, the missing audio sample can be easily repeated from the previous sample. Bad samples will not be loaded into the output converter 424. Instead the output converter 424 will repeat the previous good sample in order to keep the constant rate of output audio data. For example, the output converter 424 outputs the repeated previous sample when the error flag (bit 29) is asserted or the FIFOs 405, 420 are empty. Otherwise, the output converter 424 selectively outputs data coming from audio FIFO 405 or rate matching FIFO 420 according to delay enable signal. Therefore, according to the present invention, a break or discontinuity in the audio samples is prevented and the outputted audio signals Left, Right are continually generated.

As shown in FIG. 7, in this embodiment, the output converter 424 also includes the second shift register 428 for processing the left channel of audio data. The first shift register 426 is loaded with data words outputted from the FIFO buffer 420 having a designation left/right flag (bit 28 of the audio data word shown in FIG. 6) for the right channel, and the second shift register 428 is loaded with data words outputted from the FIFO buffer 420 having a designation left/right flag (bit 28 of the audio data word shown in FIG. 6) for the left channel. Concerning the logic 702, the R-Load signal for the first shift register 426 could be generated by a logic AND of the valid flag and the left/right flag of the data word, and the L-Load signal for the second shift register 428 could be generated by a logic AND of the valid flag and the inverse of the left/right flag of the data word. By including a validity indicator in each data word of the digital audio signal 419, the first shift register 426, for example, is only loaded with outputted data words for which the validity indicator is asserted. In this way, during the time that no valid data word is outputted, the outputted audio information (I²S, S/PDIF) will correspond to the repeating bits being shifted in from the first shift register 426 (and/or the second shift register 428). However, the present invention is not limited to having two shift registers with load signals being configured as in this embodiment. Other embodiments are also possible as will be recognized by a personal of ordinary skill in the art after having read the above description. For example, in a system having only one channel, only a single shift register need be used within the output converter 424.

Figure 8:
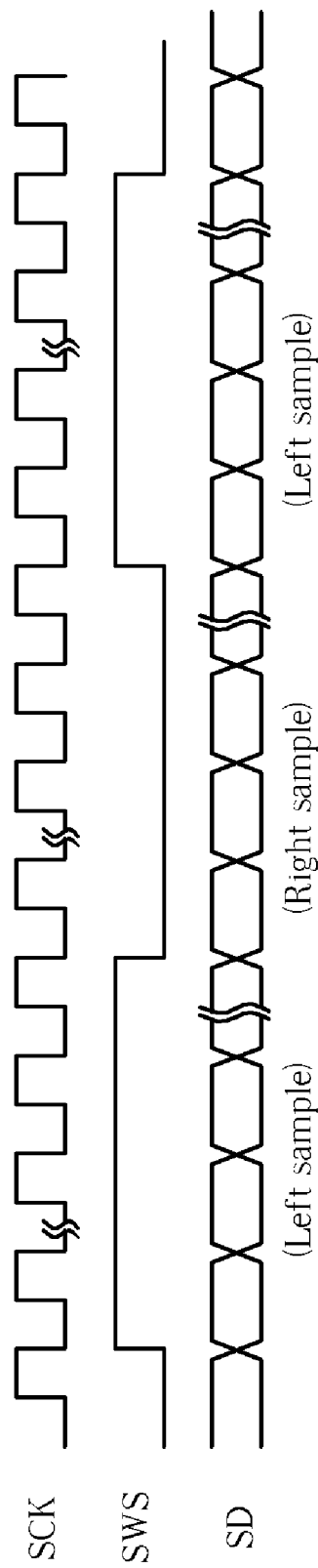
FIG. 8 shows a timing diagram of I²S audio data being outputted by the logic of FIG. 7.

FIG. 8 shows a timing diagram of I²S audio data being outputted by the logic 700 of FIG. 7. The I²S audio signal forms a constant rate audio data transmission; however, other types of audio interfaces could also be outputted by the logic 700. For example, as shown in FIG. 7, a Sony/Philips Digital Interface (S/PDIF) signal could also be outputted. The S/PDIF interface is typically found on digital audio equipment such as digital audio tape (DAT) machines or audio processing hardware. It allows the transfer of audio from one file to another without the conversion to and from an analog format, which would degrade the signal quality.

Figure 9:
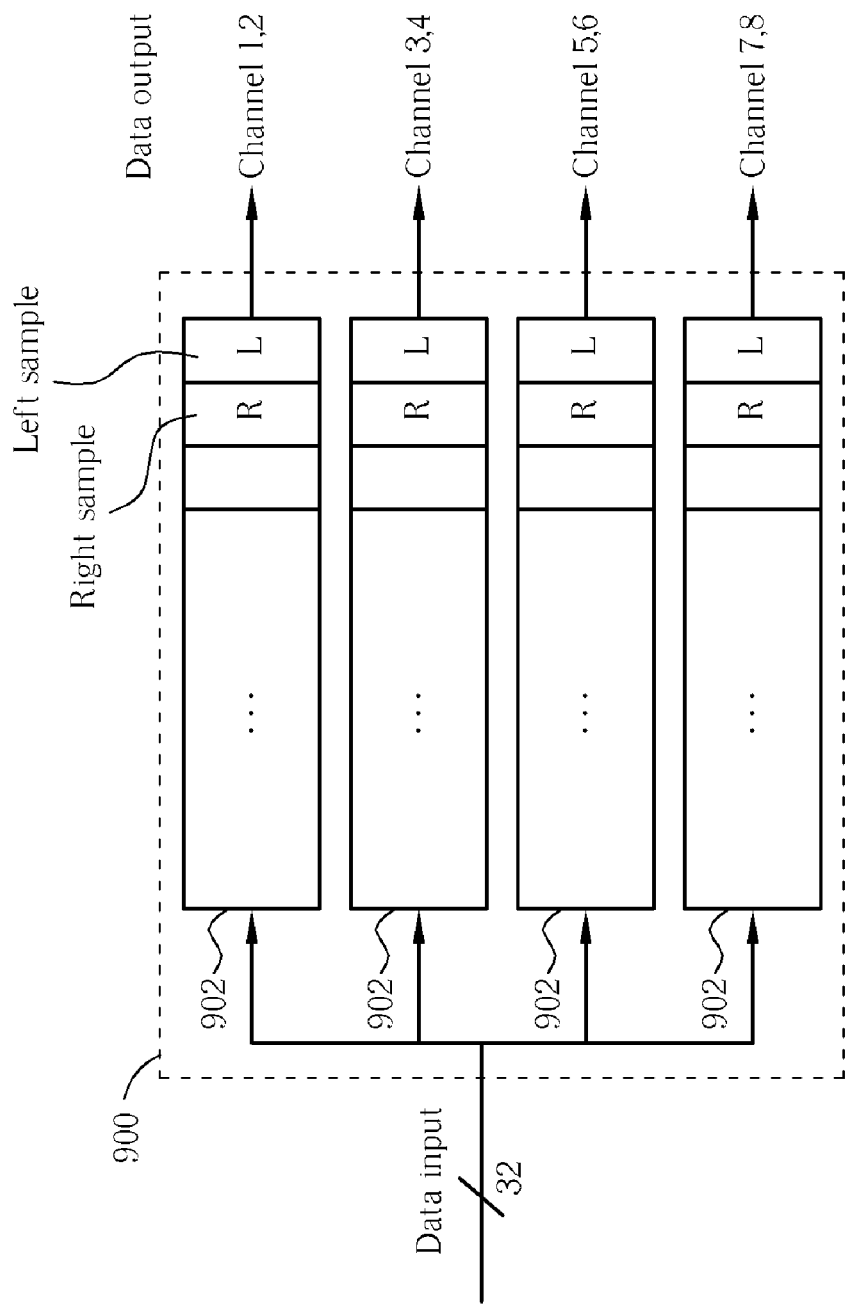
FIG. 9 shows the structure of the audio FIFO buffer and the rate matching FIFO buffer according to another exemplary embodiment of the present invention.

FIG. 9 shows the structure of the rate matching FIFO buffer 420 according to another exemplary embodiment of the present invention. As shown in FIG. 9, the FIFO buffer 900 is expanded to support an 8-channel stereo data format. In this embodiment, the FIFO buffer 900 includes four parallel channels of cells 902. Each of the parallel channels of cells 902 is organized sequentially and is for holding data words of a different channel of the digital audio signal 419. The structure of the FIFO buffer 900 as described in FIG. 9 according to the present invention can be utilized with the rate matching FIFO buffer 420, or both the rate matching FIFO buffer 420 and the audio FIFO buffer 405 within the shared buffer 404. The operation of each channel of cells 902 is similar to the operation of the FIFO buffer 420 shown in FIG. 5.

Figure 10:
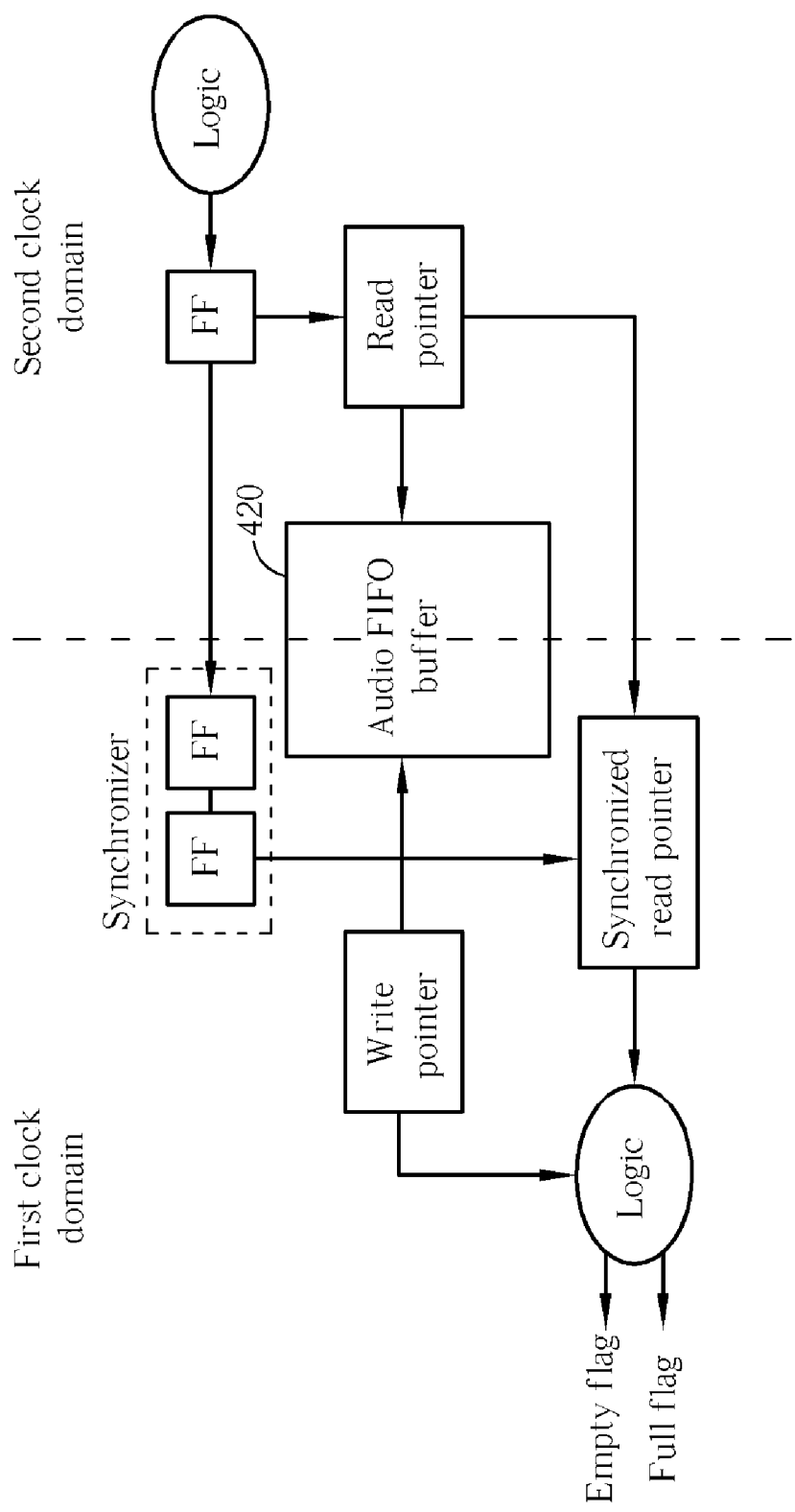
FIG. 10 shows a logic block diagram for the audio rate-matching FIFO buffer with the read and write pointers synchronization for empty and full flags generation.

FIG. 10 shows an overall block diagram for implementing the rate matching FIFO buffer 420 as shown in FIG. 5 (or the FIFO buffer 900 of FIG. 9) according to the present invention. In this embodiment, the digital audio signal 419 enters the input of the first cell in the FIFO buffer 420 being in a first clock domain, and the data words being outputted by the FIFO buffer 420 are in a second clock domain.

Figure 11:
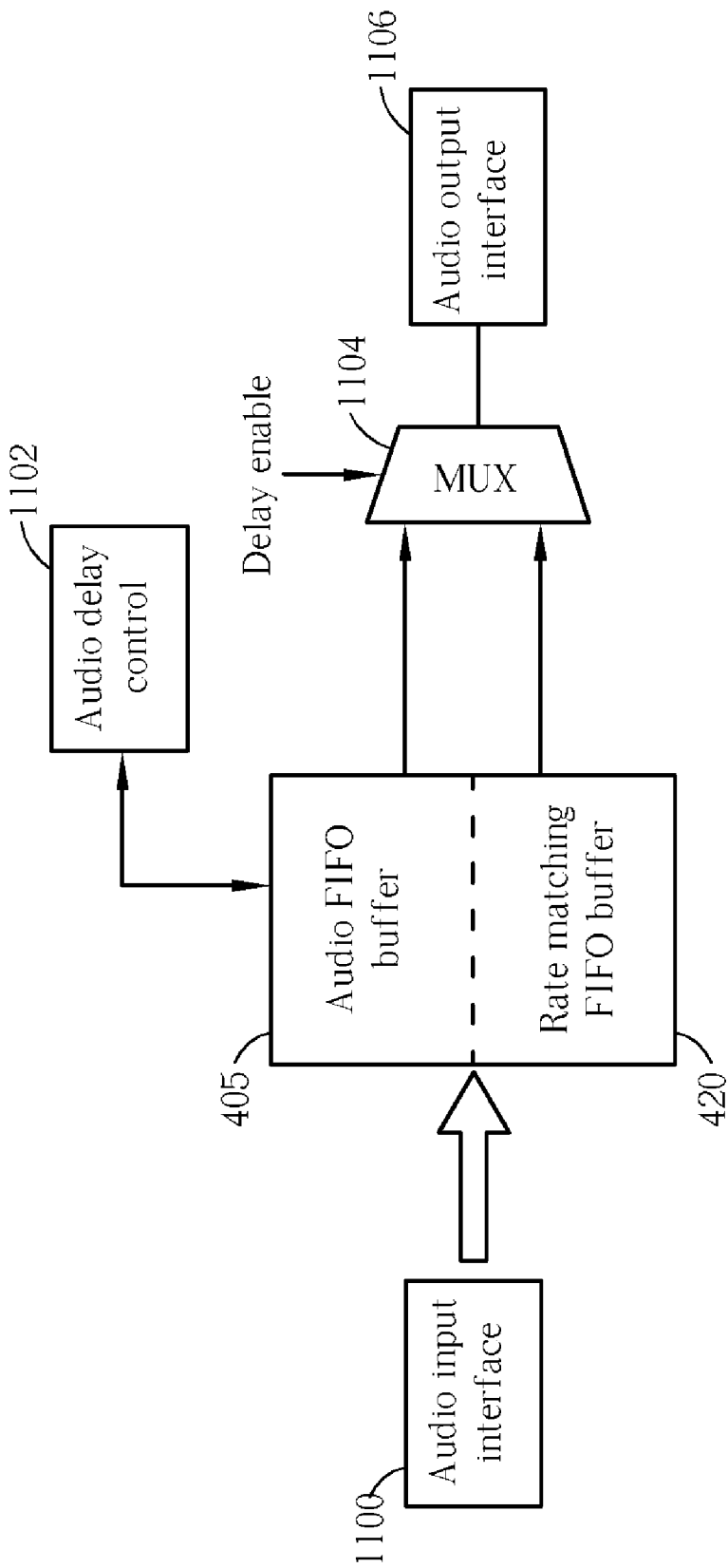
FIG. 11 shows a block diagram of control circuitry for controlling the functions of the audio FIFO buffer and the rate matching FIFO buffer according to the present invention.

FIG. 11 shows a block diagram of control circuitry for controlling the audio FIFO buffer 405 and the rate matching FIFO buffer 420 according to the present invention. An audio input interface 1100 deals with audio sample input selection and formatting. An audio delay control unit 1102 is used for controlling the output state of the audio FIFO buffer 405. The multiplexer 1104 is used for selecting the output sample from the either audio FIFO buffer or the rate matching buffer. The audio output interface 1106 is used for converting audio data to the proper format and outputting the data of the correct format.

Figure 12:
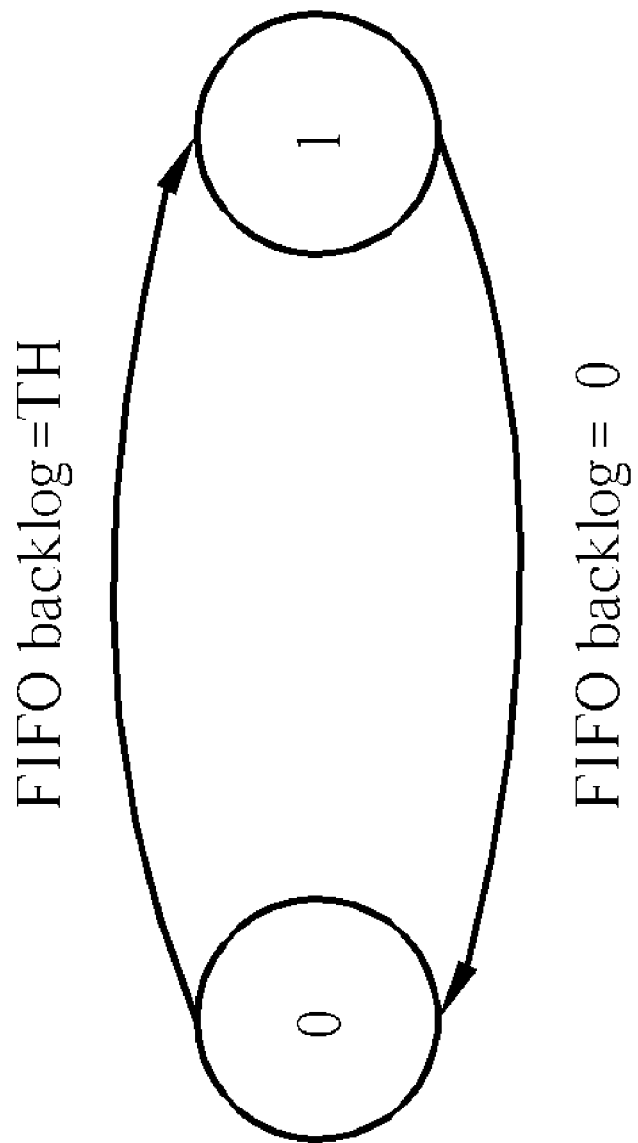
FIG. 12 shows a state diagram of the audio delay control unit of FIG. 11.

FIG. 12 shows a state diagram of the audio delay control unit 1102 of FIG. 11. As shown in FIG. 12, there are two possible states: an output disable state and an output enable state. In the output disable state (state 0), data cannot be read out of the audio FIFO buffer until the state changes to the output enable state (state 1). The state will change from state 0 to state 1 when the value of the buffer backlog is equal to a predetermined threshold value (TH). In the output enable state, the data stored in the audio delay buffer is allowed to be read out. Once the value of the buffer backlog becomes zero, the audio delay control state machine changes from state 1 to state 0. The value of the buffer backlog being zero means that the audio delay buffer is empty. In this situation, the audio delay control 1102 should stop data readout at state 0. The value of the buffer backlog being equal to TH means that the audio data is TH samples delayed, and the data could be read out from such audio delay buffer. Generally speaking, input audio data will be simultaneously written into the buffer while the output audio data are read out from the buffer so the buffer backlog will rarely be reduced to zero in the audio delay mode.

Figure 13:
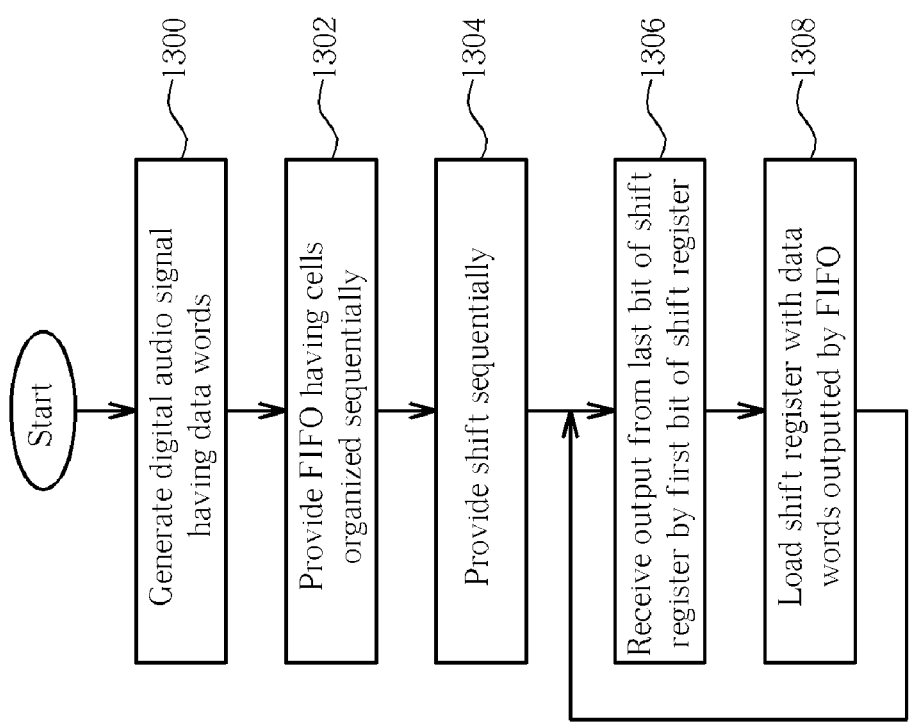
FIG. 13 shows a method of buffering audio in a multimedia receiver according to an exemplary embodiment of the present invention.

FIG. 13 shows a method of buffering audio in a multimedia receiver according to an exemplary embodiment of the present invention. It should be noted that provided that substantially the same result is achieved, the steps of the flowchart of FIG. 13 need not be in the exact order shown and need not be contiguous, that is, other steps can be intermediate. In this embodiment, the method of buffering audio in a multimedia receiver includes the following steps:

Step 1300: Generate a digital audio signal having transmitted therein a plurality of data words according to an incoming audio signal.

Step 1302: Provide a first-in-first-out (FIFO) buffer having a plurality of cells being organized sequentially for holding data words of the digital audio signal. Wherein, the FIFO buffer has an input of a first cell of the FIFO buffer being coupled to the digital audio signal to allow the first audio data words inputted into the FIFO buffer to also be the first audio data words later outputted by the FIFO buffer.

Step 1304: Provide a first shift register having a plurality of bits being organized serially.

Step 1306: Receive an output from a last bit of the first shift register by a first bit of the first shift register.

Step 1308: Load the first shift register with data words outputted from the FIFO buffer. In this way, during the time that no data words are outputted by the FIFO buffer, the shift register will repetitively shift bits from the output to the input of the shift register.

The present invention provides a first-in-first-out (FIFO) buffer architecture and related method of audio data buffering for use in a multimedia receiver. A first-in-first-out (FIFO) buffer is coupled to a digital audio signal and comprises a plurality of cells being organized serially for holding data words of the digital audio signal. A first cell of the FIFO buffer has an input being coupled to the digital audio signal. A first shift register has a plurality of bits being organized serially, wherein a first bit of the first shift register receives an output from a last bit of the first shift register. Additionally, each bit of the first shift register is coupled to a corresponding bit in an outputted data word of the FIFO buffer. The first shift register is loaded with data words outputted from the FIFO buffer. When no data words are outputted by the FIFO buffer, the first shift register repetitively shifts bits outputted by the first shift register into the first shift register. In this way, even when audio data words are dropped or missing due to errors, audio distortion such as a loud popping sound or clicking noise in the resulting audio signal is prevented by continually generating an outputted audio signal.

The present invention further discloses an audio buffering method. A digital audio signal having transmitted therein a plurality of data words according to an incoming audio signal is generated. A rate matching FIFO buffer sequentially receives and outputs the digital audio signal. Alternatively output a current sample of the digital audio signal and repeat a previous good sample. Finally, an output complying with $I^2S$ or S/PDIF standard format is generated. Preferably, the rate matching FIFO buffer sequentially buffers the digital audio signal in the first clock domain and sequentially outputs the digital audio signal in the second clock domain. The data words comprise a plurality of right channel samples and a plurality of left channel samples and are organized sequentially in said FIFO buffer. The previous good sample is repeated while a validity indicator of the current sample is deasserted or the FIFO buffer is empty. The current sample is outputted while the validity indicator of the current sample is asserted.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An audio buffering system in a multimedia receiver, the audio buffering system comprising:
    an audio interface being coupled to an incoming audio signal for generating a digital audio signal having transmitted therein a plurality of data words;
    a first-in-first-out (FIFO) buffer for receiving the digital audio signal comprising a plurality of cells being organized sequentially for holding data words of the digital audio signal, wherein a first cell of the FIFO buffer has an input receiving the digital audio signal; and
    a first shift register having a plurality of bits being organized serially, wherein a first bit of the first shift register directly receives an output from a last bit of the first shift register, and each bit of the first shift register is coupled to a corresponding bit in an outputted data word of the FIFO buffer, wherein each data word of the digital audio signal further comprises a validity indicator, and in response to the validity indicator indicating an error condition, the first shift register shifts bits output from the last bit of the first shift register directly back into the first bit of the first shift register;
    wherein the first shift register is selectively loaded with data words outputted from the FIFO buffer.

2. The audio buffering system of claim 1, wherein the FIFO buffer further comprises a plurality of parallel channels of cells, each of the parallel channel of cells being organized sequentially and for holding data words of a different channel of the digital audio signal.

3. The audio buffering system of claim 1, further comprising an audio source selector for selecting between a plurality of different incoming audio signals.

4. The audio buffering system of claim 1, wherein each data word of the digital audio signal being stored in the cells of FIFO buffer further comprises a designation bit for indicating the alternative of a right side audio channel and a left side audio channel.

5. The audio buffering system of claim 4, further comprising a second shift register having a plurality of bits being organized serially, wherein a first bit of the second shift register receives an output from a last bit of the second shift register, and each bit of the second shift register is coupled to a corresponding bit in the outputted data word of the FIFO buffer;
    wherein data words outputted from the FIFO buffer having a designation of left are selectively loaded into the first shift register, and data words outputted from the FIFO buffer having a designation of right are selectively loaded into the second shift register.

6. The audio buffering system of claim 1, wherein the digital audio signal received by the input of the first cell in the FIFO buffer is in a first clock domain, and the data words being outputted by the FIFO buffer are in a second clock domain.

7. The audio buffering system of claim 1, wherein the first shift register stores bits of only a single data word at a time.

8. The audio buffering system of claim 1, wherein a capacity of the first shift register is equal to the number of audio sample data bits in a single data word.

9. A method of buffering audio in a multimedia receiver, the method comprising:
   generating a digital audio signal having transmitted therein a plurality of data words according to an incoming audio signal;
   providing a first-in-first-out (FIFO) buffer having a plurality of cells being organized sequentially for holding data words of the digital audio signal, and having an input of a first cell of the FIFO buffer being coupled to the digital audio signal;
   providing a first shift register having a plurality of bits being organized serially;
   directly receiving an output from a last bit of the first shift register by a first bit of the first shift register, wherein each data word of the digital audio signal further comprises a validity indicator, and in response to the validity indicator indicating an error condition, the first shift register shifts bits output from the last bit of the first shift register directly back into the first bit of the first shift register; and
   selectively loading the first shift register with data words outputted from the FIFO buffer, wherein the first shift register stores bits of only a single data word at a time.

10. The method of claim 9, further comprising providing the FIFO buffer having a plurality of parallel channels of cells, each of the parallel channel of cells being organized sequentially and for holding data words of a different channel of the digital audio signal.

11. The method of claim 9, further comprising selecting between a plurality of different incoming audio signals.

12. The method of claim 9, wherein each data word of the digital audio signal being stored in the cells of FIFO buffer further comprises a designation bit for indicating the alternative of a right side audio channel and a left side audio channel.

13. The method of claim 9, wherein a capacity of the first shift register is equal to the number of audio sample data bits in a single data word.

* * * * *